United States Patent [19]

Sakashita et al.

[11] Patent Number: 5,548,708
[45] Date of Patent: Aug. 20, 1996

[54] IMAGE EDITING USING HIERARCHICAL CODING TO ENHANCE PROCESSING SPEED

[75] Inventors: Yukihiko Sakashita, Hadano; Akira Ishizaki, Atsugi, both of Japan

[73] Assignee: Canon Kabushiki Kaisha, Tokyo, Japan

[21] Appl. No.: 64,885

[22] Filed: May 24, 1993

[30] Foreign Application Priority Data

May 27, 1992 [JP] Japan .................................. 4-134767

[51] Int. Cl.⁶ .......................... G06F 15/00; G06F 12/00
[52] U.S. Cl. ................................................ 395/162; 395/164
[58] Field of Search ............................ 346/108; 348/384, 348/409, 415, 416; 358/302; 382/56; 395/150

[56] References Cited

U.S. PATENT DOCUMENTS

| | | | |
|---|---|---|---|
| 4,742,558 | 5/1988 | Ishibashi et al. | 382/56 |
| 4,888,812 | 12/1989 | Dinan et al. | 382/7 |
| 4,924,521 | 5/1990 | Dinan et al. | 382/54 |
| 5,014,127 | 5/1991 | Richards | 348/384 |
| 5,045,869 | 9/1991 | Isaka et al. | 346/108 |
| 5,121,448 | 6/1992 | Katayama et al. | 382/57 |
| 5,185,662 | 2/1993 | Liston | 358/78 |

FOREIGN PATENT DOCUMENTS

| | | | |
|---|---|---|---|
| 152355 | 8/1985 | European Pat. Off. | H04N 1/41 |
| 392753 | 10/1990 | European Pat. Off. | H04N 1/387 |
| 453802 | 10/1991 | European Pat. Off. | G06F 15/20 |

*Primary Examiner*—Mark R. Powell
*Assistant Examiner*—U. Chauhan
*Attorney, Agent, or Firm*—Fitzpatrick, Cella, Harper & Scinto

[57] ABSTRACT

Image data is hierarchically coded by a coder, and the coded data is stored in a database. A decoder hierarchically decodes the coded data stored in the database, and image data corresponding to each hierarchy is generated. The decoder generates image data of a plurality of levels of resolutions from a low resolution to high resolution from the coded data stored in the database. The image data of the high resolution is original image data. Editing such as enlargement, reduction, transfer, and rotation, specified by an operator, is executed using the image data of the low resolution obtained from the decoder. The content of the edit processing by the operator is stored in a memory. When the editing operation ends, CPU executes the edit processing on the original image data obtained from the decoder based on the content of the edit processing stored in the memory. The final editing is thus performed on the original image data.

28 Claims, 9 Drawing Sheets

IMAGE EDITING USING HIERARCHICAL CODING TO ENHANCE PROCESSING SPEED

BACKGROUND OF THE INVENTION

The present invention relates to a data processing method and apparatus which edits image data thereof.

A conventional data editing apparatus edits image data which is stored in a database. When the image data is edited using such data editing apparatus, the following method is used. First, the image data needed for editing a single or a plurality of pages is called from the database. The data can be designated by a file name or displayed images. Then, the image data read out of the database is shown on a display and an edit operation is performed. For example, when two images are synthesized and the synthesized image is edited, an editing image for performing an edit operation on each original image and synthesized image, and an entire image showing the entire synthesized image are simultaneously displayed. The editing processing such as enlargement, reduction, rotation, transfer, copy, and layout, is performed during the image editing.

However, in the prior art, display and editing are executed using original (subject) image data as is. Accordingly, as the size of the subject image becomes larger, it takes more time to process the data. Furthermore, it takes more time to process the data when a plurality of images are displayed at the same time. Thus, in the conventional data editing apparatus, an enormous amount of time is required for data processing during editing operation, thus resulting in a problem.

Furthermore, when a desired image to be edited is searched or transmitted from the data of the plurality of pages which is stored in the image database, all image data needs to be displayed or transmitted in order to permit the operator to grasp the entire image, thus resulting in time consuming processing in search and transmission.

SUMMARY OF THE INVENTION

In light of the above problems, it is an object of the present invention to provide a data processing method and apparatus capable of processing an image at high speed using image data of low resolution when the image data is processed and displayed during the editing operation.

According to the present invention, the foregoing object is attained by a data processing apparatus comprising: storage means for storing image data having at least two levels of resolution; editing means for performing a desired edit operation using image data of a lower resolution stored in the storage means; memory means for storing processing information based on the edit processing executed by the editing means; and processing means for executing the edit processing by using image data of a higher resolution stored in the storage means.

According to the present invention, the foregoing object is further attained by a data processing method comprising: a storage step for storing image data having at least two levels of resolution; an editing step for performing a desired edit operation by using image data of a lower resolution stored in the storage step; a memory step for storing processing information based on the edit processing executed by the editing step; and a processing step for executing the edit processing using image data of a higher resolution stored in the storage step.

In this application, "edit operation" is used as a general term for image data processing such as enlargement, reduction, rotation, transfer, copy and a display for image data search and image data processing.

In the above arrangement, image data having at least two levels of resolutions, for example, image data having a high resolution and image data having a low resolution, are stored in storage means. In editing means, since the image data having a low resolution is used, processing of the edit operation is performed at a high speed. The content of edit processing of the image data in this editing means is stored in storage means. Processing means executes the edit processing on the image data having a high resolution based on the content of the edit processing stored in the storage means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

The preferred embodiments of the present invention will now be described in detail in accordance with the accompanying drawings.

Figure 1:
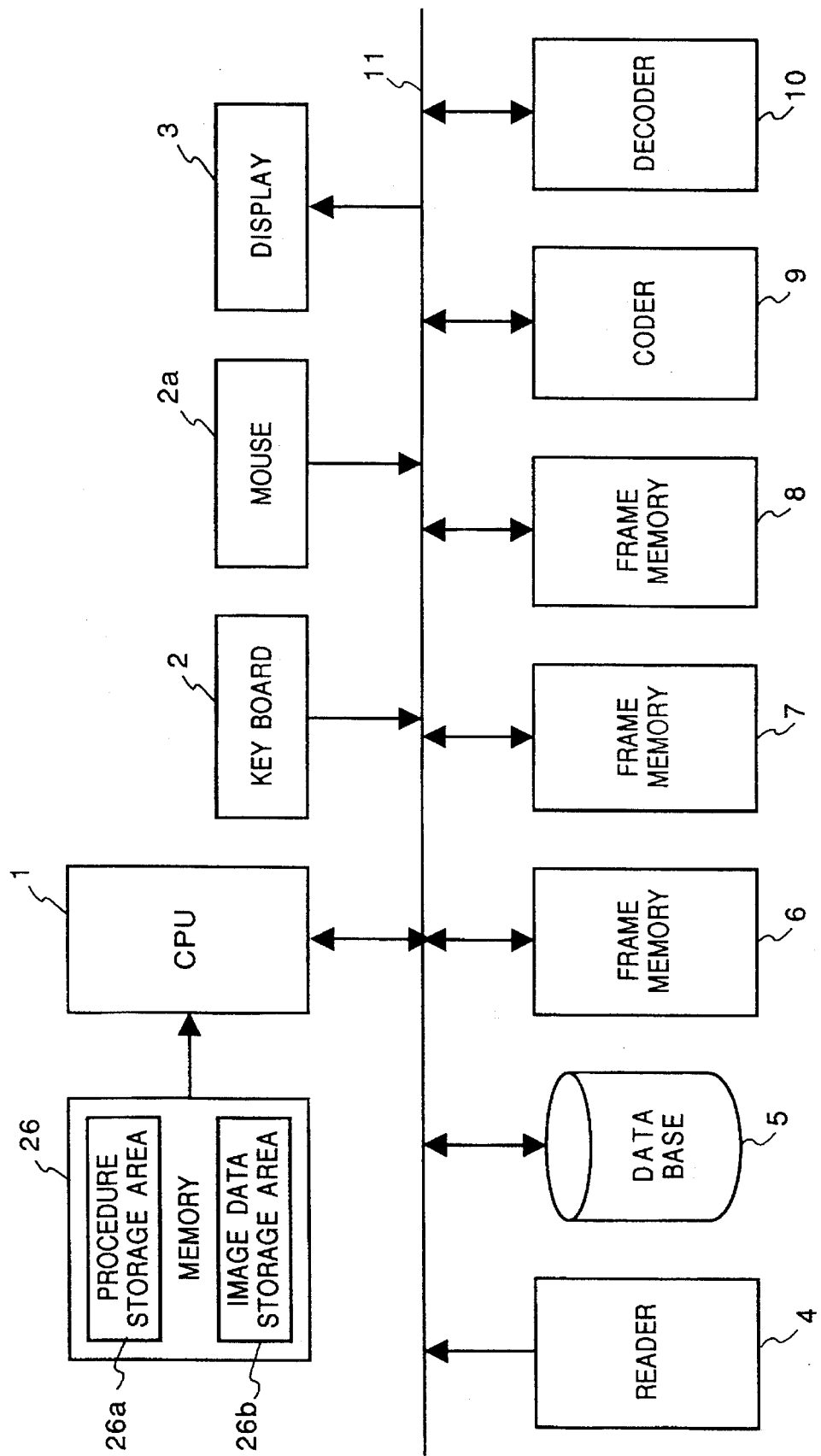
FIG. 1 is a block diagram illustrating a general construction of the data processing apparatus according to the present embodiment.

FIG. 1 is a block diagram illustrating a general construction of the data processing apparatus according to the present embodiment. In FIG. 1, numeral 1 is a controller (CPU) which performs an operational control over the data processing apparatus. Numeral 2 is a key-board which inputs characters, symbols, and various instructions for image editing. Numeral 2a is a mouse which designates a desired position on the display screen on a display 3. The display 3 displays an image to be edited, characters, and the like. Numeral 4 is a reader which reads an original image and inputs the image data. Numeral 5 is a database which stores information concerning the image data for the plurality of pages. Numerals 6, 7 and 8 are frame memories which can respectively store the image data for at least one screen. In the present data processing, the image data outputted from a decoder 10 is stored in the frame memories 6 and 7 and the image data to be coded by a coder 9 is stored in the frame memory 8.

The coder 9 codes the image data hierarchically. The decoder 10 decodes the image data which is hierarchically coded by the coder 9. The hierarchical coder and decoder are described later. Numeral 11 is a bus which connects the above-described units and enables the reception/transmission of the data between the units. Numeral 26 is a memory having an operational area for the CPU 1. The memory 26 is provided with the area for storing the image data where the edit processing is performed by the CPU 1 (an image data storage area 26b), the area for storing the content of the edit operation (a procedure storage area 26a), and the area for storing the procedure which operates the present apparatus. Furthermore, the memory 26 is comprised of RAM and ROM.

Figure 2:
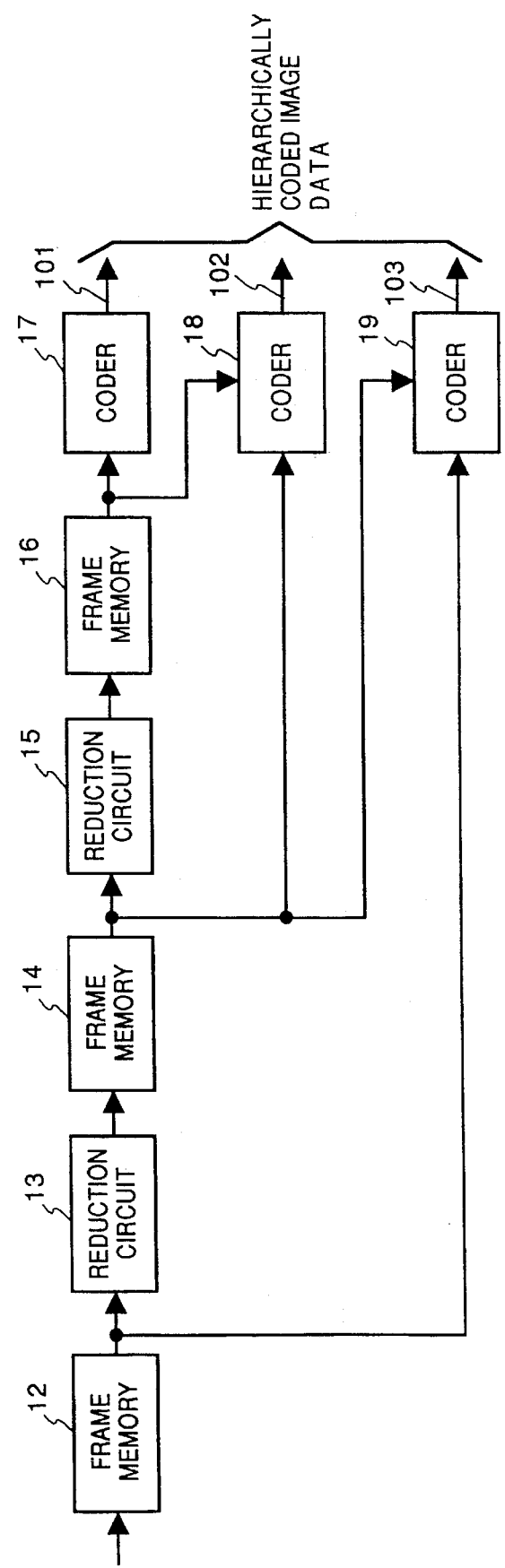
FIG. 2 is a block diagram illustrating an example of the construction of the coder of the present embodiment.

FIG. 2 is a block diagram illustrating an example of the construction of the coder 9 which executes a hierarchical coding. Numerals 12, 14 and 16 are frame memories which store the image data. Numeral 13 and 15 are reduction circuits and numeral 17, 18 and 19 are coders. The subject image data outputted from either the reader 4 or the frame memory 8 is stored in the frame memory 12. The subject image data stored in the frame memory 12 is reduced to an image of ½ size in the vertical and lateral directions in a reduction circuit 13 and stored in the frame memory 14. As a reduction method, for example, a sub-sampling to 1/n (n=2 in this embodiment) in the vertical and lateral directions can be performed. Another reduction method is such that a filtering is performed by a low-pass filter, high-pass filter, or recursive filter, and sub-sampling can be performed after threshold processing is performed on a value obtained from the filtering. However, the methods are not limited to the above examples. The ½-size image data stored in the frame memory 14 is further reduced to the image of ½ size in the vertical and lateral directions in the reduction circuits 15 and stored in the frame memory 16. Accordingly, in the frame memory 16, the image which is a ¼ size of the image stored in the frame memory 12 is stored.

The coder 17 performs entropy coding on the image data stored in the frame memory 16 and the coded data at a first stage is outputted via a signal line 101. In the coder 18, the image stored in the frame memory 14 is entropy-coded referring to the image stored in the frame memory 16 and the coded data of a second stage is outputted via a signal line 102. The coder 18 codes the data needed to obtained the image data which is reduced to ½ by making up the image data which is reduced to ¼. In the coder 19, the entropy coding is performed on the image stored in the frame memory 12 referring to the image stored in the frame memory 14, and the coded data of a third stage is outputted via a signal line 103. That is, the data needed for obtaining the subject image data is coded by making up the image data which is reduced to ½. The hierarchically (resolution based) coded image data are stored in the database 5 in the order from the data having a lower resolution.

In this embodiment, the entropy coding is used as a coding method; however, another coding method can be also used. Furthermore, not only the hierarchically coded image data can be accumulated in the database 5, but also the data can be transmitted to another system via a network.

Accordingly, when the hierarchical coding is executed, the data amount of the coded data is reduced in comparison with the case where the image data of each resolution are respectively coded, resulting in more effective use of the memory.

Next, the method for hierarchical decoding for the hierarchically coded data is described.

Figure 3:
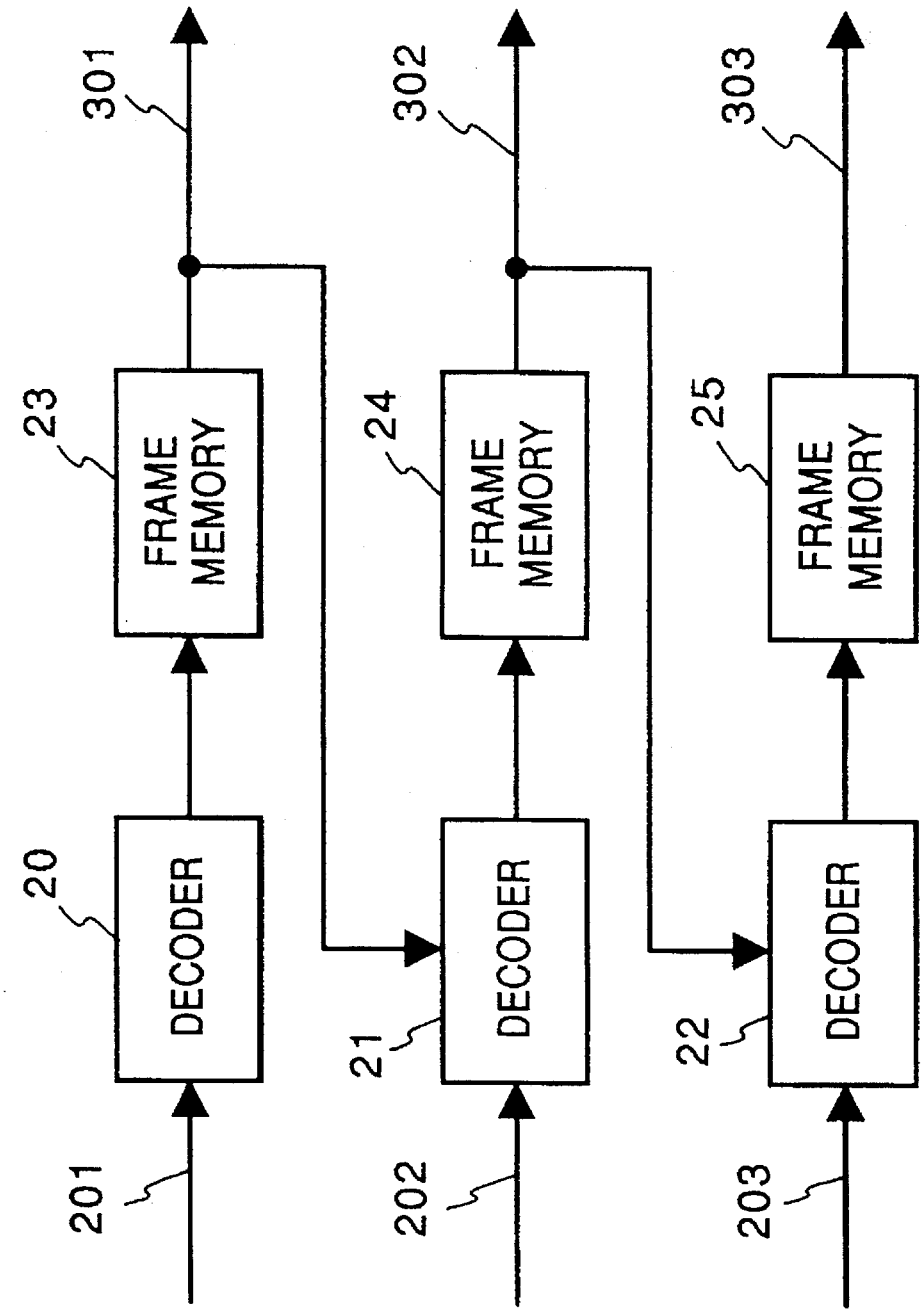
FIG. 3 is a block diagram illustrating an example of the construction of the decoder of the present embodiment.

FIG. 3 is an example of the block diagram of the decoder 10 which performs a hierarchical decoding. Numeral 20, 21 and 22 are decoders and numeral 23, 24 and 25 are frame memories. Among the coded data (a signal which is hierarchically coded) which is coded and stored in the database 5, the coded data of the first stage is inputted to a decoder 20 by a signal line 201. The result which is decoded in the decoder 20 is stored in the frame memory 23 as the image data of the first stage and outputted from a signal line 301. The image data of the first stage is an image which is reduced to ¼, and has a low resolution. When the reduced image to perform the edit processing is generated, the decoding processing ends at this stage where the image data of the first stage obtained from the signal line 301 is stored either in the frame memory 6 or 7. When an operator searches the database 5 for the subject image, the image data of the first stage is also used.

When the subject image is generated by the decoder 10, the following processing is further performed. In the coded data (the signal which is hierarchically coded) which is read out of the database 5, the coded data of the second stage is inputted to the decoder 21 by the signal line 202. In the decoder 21, the coded data of the second stage is decoded referring to the image data of the first stage stored in the frame memory 23. The result of the decoding is stored in the frame memory 24 as the image data of the second stage and outputted from a signal line 302. The image data of the second stage is an image which is reduced to ½, and image data having an intermediate resolution. Furthermore, the coded data of a third stage (a high resolution) which is read out of the database 5 is inputted to the decoder 22 by the signal line 203. In the decoder 22, the coded data of the third stage is decoded referring to the image data of the second stage stored in the frame memory 24. The result is stored in the frame memory 25 as the image data of the third stage and outputted from a signal line 303. The image data stored in the frame memory 25 expresses the subject image before the coding.

In the present embodiment, an operator performs the edit operation processing while looking at the display where the image data having a low resolution (that is, a reduced image data) which is read out of the frame memory 23. The procedure of the edit operation processing is stored in the procedure storage area 26a of the memory 26. After this processing ends, the CPU 1 executes an actual edit processing on the image data (that is, the subject image data) which is read out of the frame memory 25 in accordance with the procedure of the edit operation processing stored in the memory 26.

As reduced image data which is used for the edit processing, the hierarchical image of the first stage is used in this embodiment, but the present invention does not impose this arrangement as a necessary limitation. Furthermore, the hierarchy of the image data has three stages. However, the processing is possible regardless of the number of stages.

Figure 4:
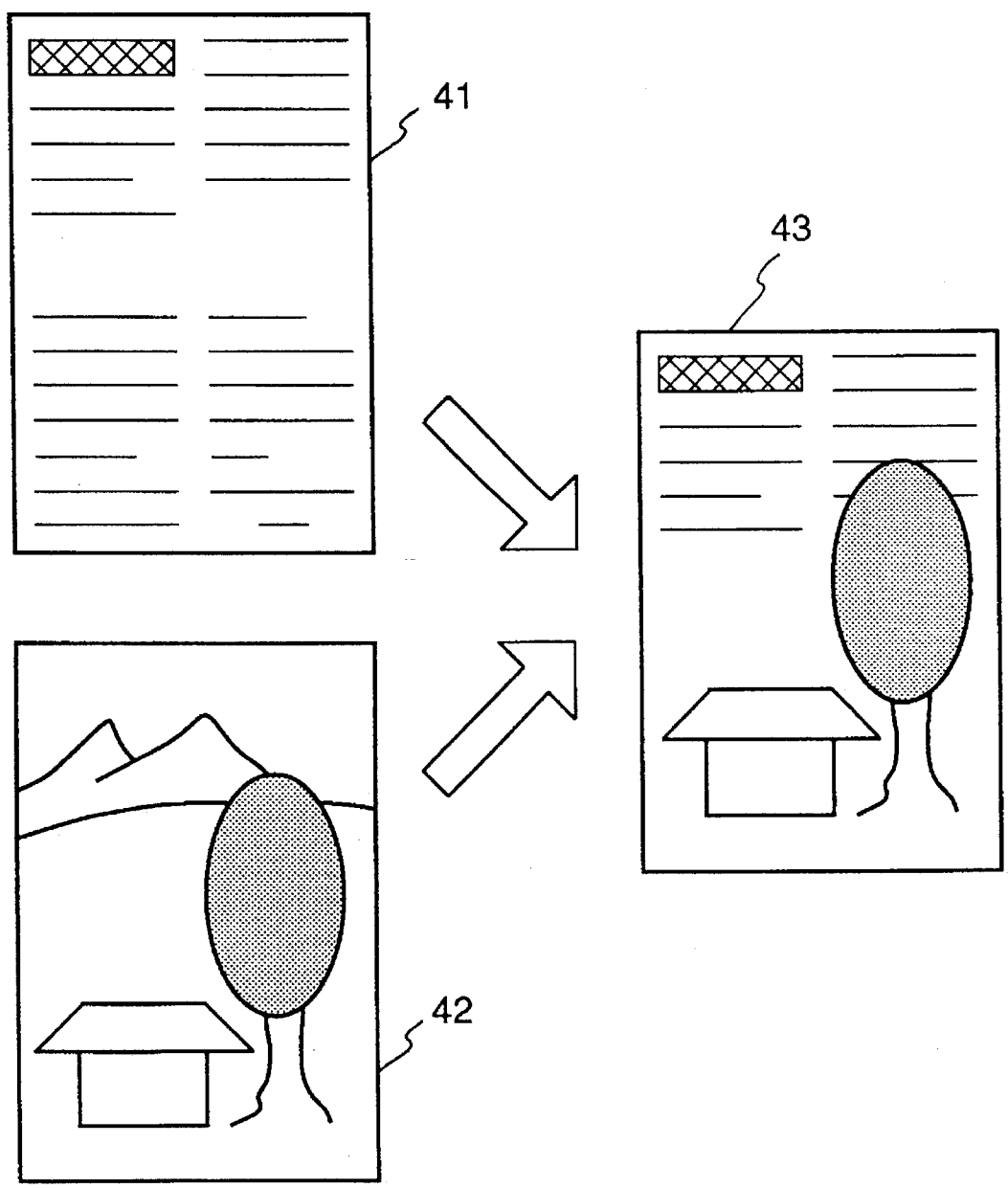
FIG. 4 shows an example of the edit processing of the present embodiment.

The procedure of the edit processing according to the data processing apparatus of the present embodiment having the above arrangement is described. As examples of the edit processing, the following processings are described: (1) An original image is read by the reader 4 and the image data is stored in the database 5; and (2) the image data for a plurality of pages (two pages in this embodiment) are read, desired portions are cut out from each page and synthesized together, and stored in the database. FIG. 4 shows the edit processing. The edit processing is to obtain a synthesized image 43 from subject images 41 and 42 which are read by the reader 4.

Figure 5:
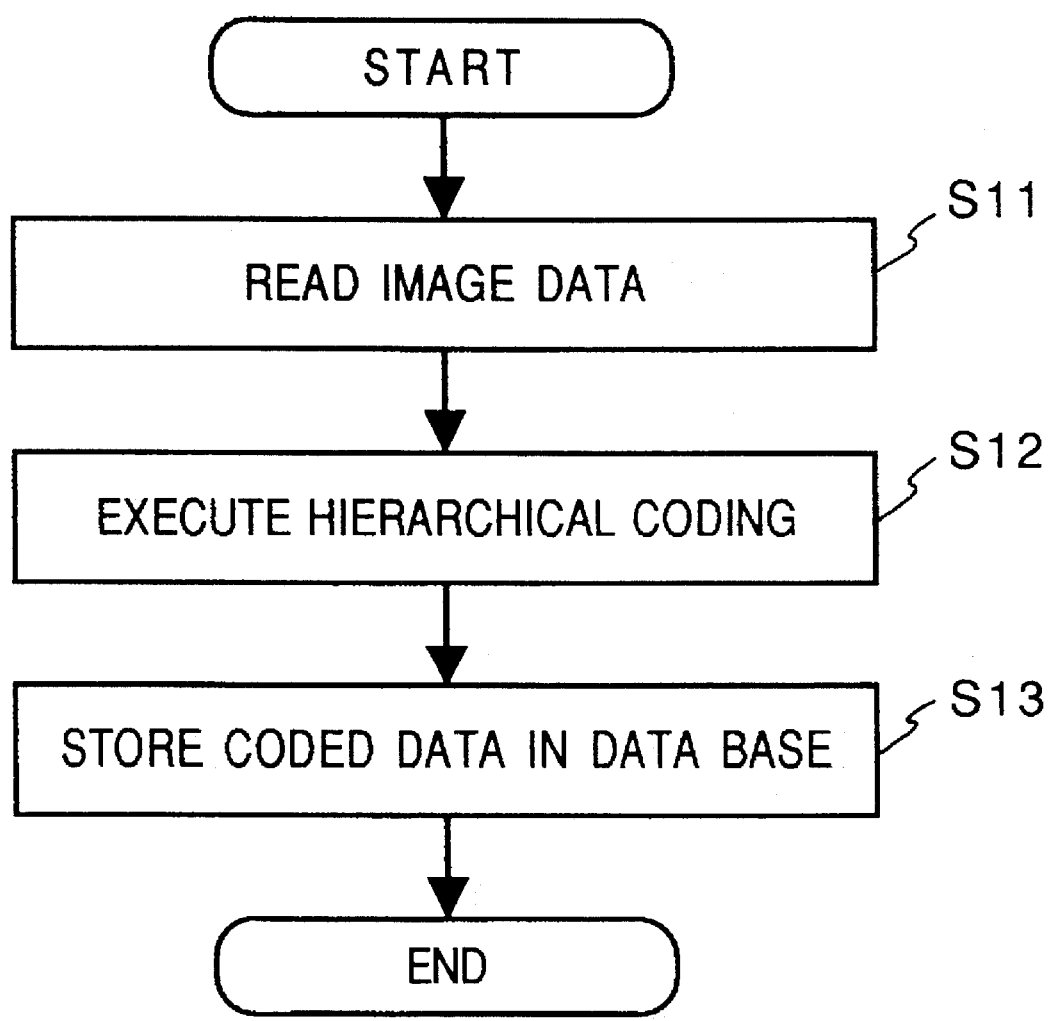
FIG. 5 is a flowchart showing the procedure for reading an image of the data processing apparatus of the present embodiment.
Figure 6:
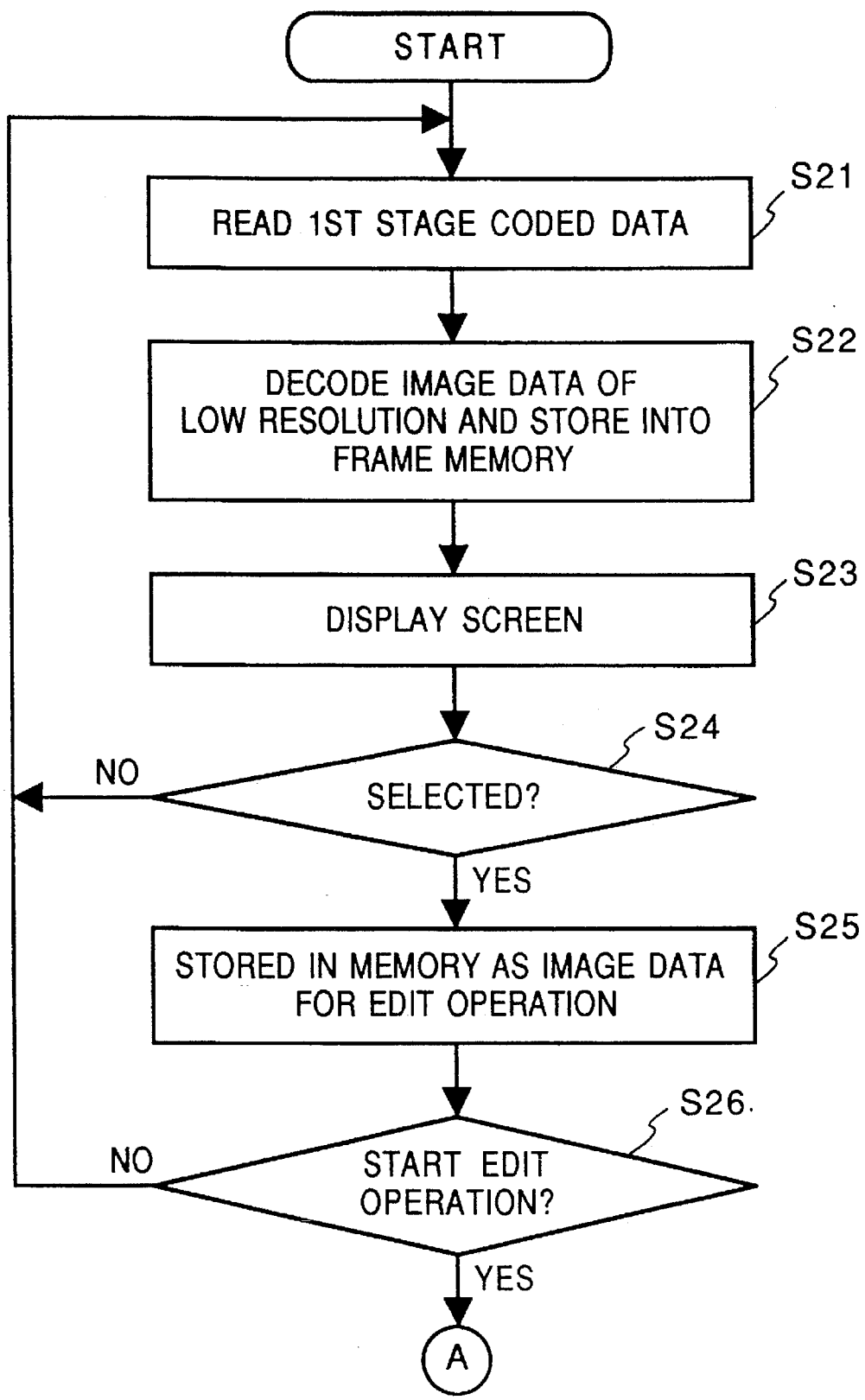
FIG. 6 is a flowchart showing the procedure for processing the image editing according to the data processing apparatus of the present embodiment.
Figure 7:
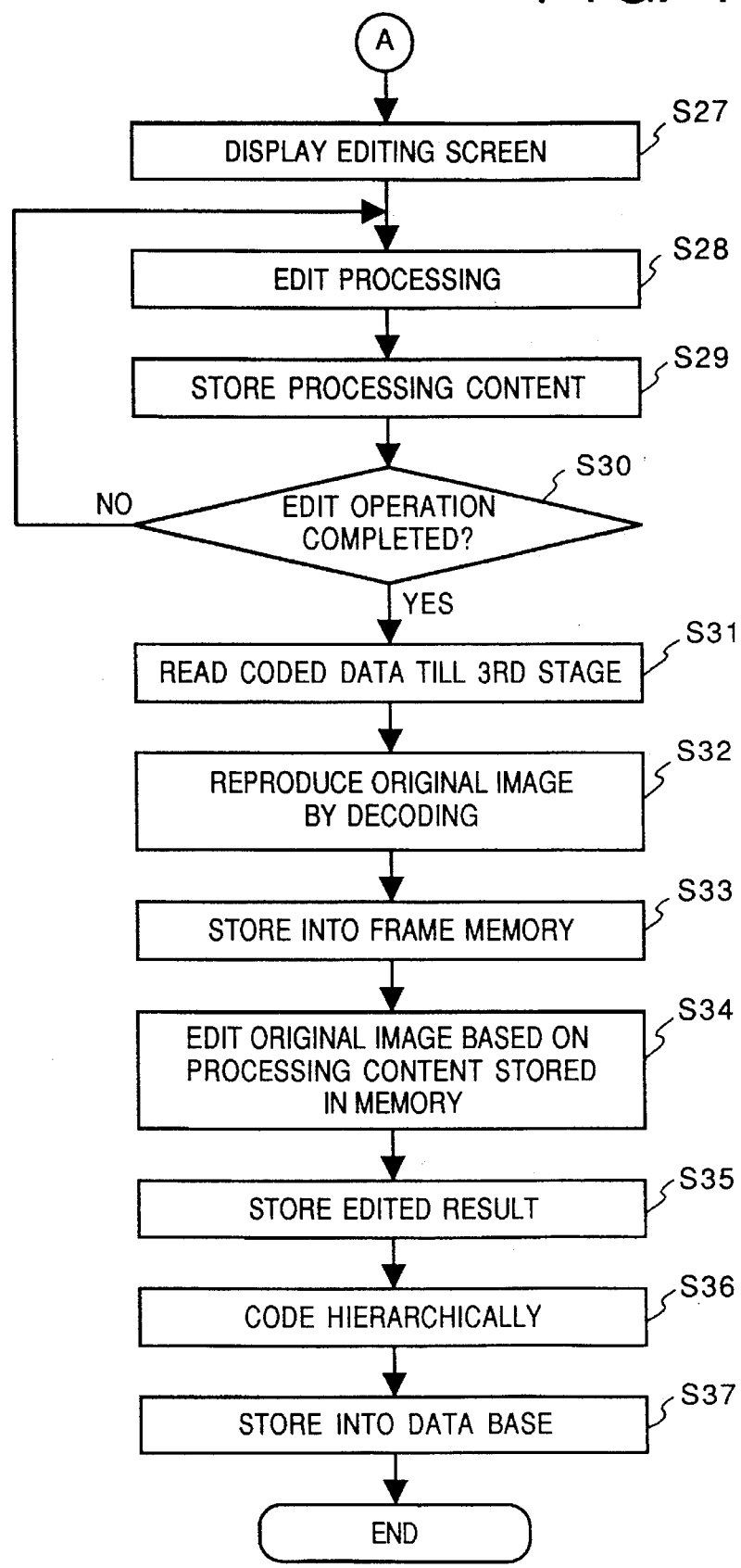
FIG. 7 is a flowchart showing the procedure for processing the image editing according to the data processing apparatus of the present embodiment.
Figure 8:
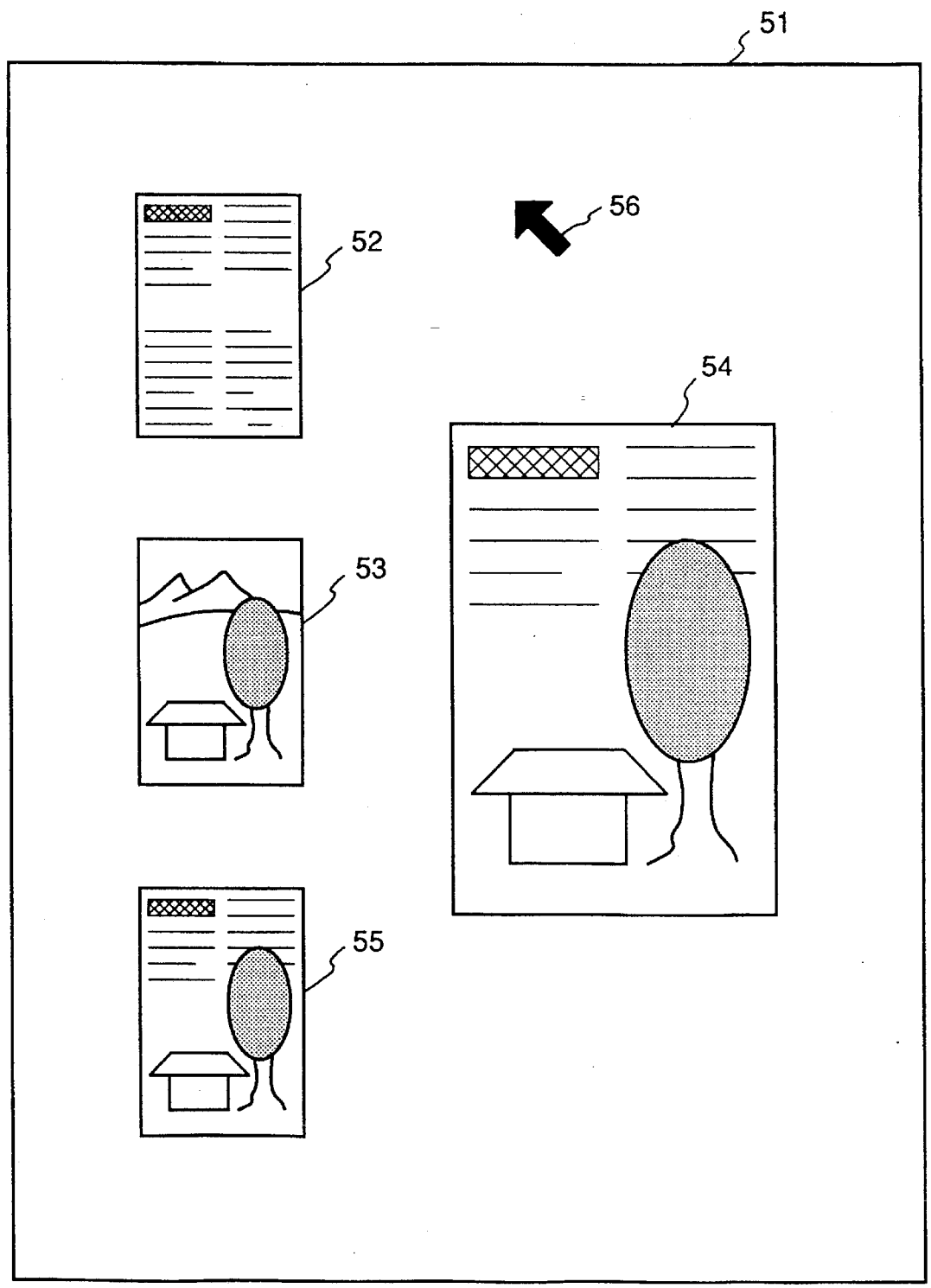
FIG. 8 shows an example of the screen during the edit operation in the data processing apparatus of the present embodiment.

FIG. 5 is a flowchart showing the procedure for reading the image of the present data processing apparatus. FIGS. 6 and 7 are flowcharts showing the procedure for the processing of the image editing according to the data processing apparatus. FIG. 8 shows a display screen during the edit operation in the present data processing apparatus.

First, the processing to input the image data is described referring to FIG. 5. At step S11, the subject image data is inputted from the reader 4 and stored in the image data storage area 26b. At step S12, a hierarchical coding is executed on the subject image data stored in the image data storage area 26b by the coder 9. At step S13, by the above procedure, in the data coded hierarchically, the coded data are sequentially stored in the database 5 in order from the coded data having the low resolution, and a name of the data and the information indicative of a resolution. Names of the data can be inputted by a user through the key-board 2 and the resolution is automatically added by the CPU 1.

In the edit operation, the operator searches for the images (the subject images 41 and 42) for two pages to be synthesized from the plurality of the images stored in the database 5, and the synthesizing operation is performed while monitoring the display 3. The procedure for processing in the edit operation is described referring to FIGS. 6 and 7.

At steps S21–S26 (FIG. 6), the search for images which are subjected to the editing is performed based on the input from the key-board 2. At step S21, the coded data of the first stage is read out of the database 5. At step S22, decoding to the first stage is executed by the decoder 10, and the generated image data having a low resolution is stored in the frame memory 6. At step S23, the image data having the low resolution which is stored in the frame memory 6 at step S22 is displayed on the display 3. At step S24, the user judges if the displayed image is a desired image for editing. If so, this image is selected and the process proceeds to step S25, while if not, this image is not selected and the process returns to step S21 where the above processing is repeated to the next image data.

At step S25, the image data having the low resolution which is selected as an original image of the edit processing is stored in the image data storage area 26b of the memory 26. At step S26, if the search of the subject image in the edit operation has ended, the process proceeds to step S27 (FIG. 7) to start the edit operation. On the other hand, if the search has not ended, since the edit processing cannot be started, the process returns to step S21 where the above processing is repeated on the next image data.

When the edit operation starts, an editing screen is shown on the display 3 at step S27. An example of the editing screen is shown in FIG. 8. In FIG. 8, numeral 51 indicates a display screen of the display 3. Numeral 52 is an original image display according to the image data of the low resolution of the original image 41, and numeral 53 is an original image display according to the image data of the low resolution of the original image 42. Numeral 54 is an editing image display 54 to perform the edit operation. Numeral 55 is an entire image display where the entire image of the editing image displayed on the editing image display 54, in which locations of the synthesized portions in the entire synthesized image display 55 are shown. Referring to the entire image display 55, when the image for editing is enlarged in the edit operation, to which portion of the entire image the portion displayed on the editing image display 54 corresponds can be easily confirmed. Numeral 56 is a cursor which indicates a desired position on the display screen 51 and moved by the operation of a mouse 2a or cursor key on the key-board 2.

At step S28, the CPU 1 performs the edit processing in accordance with the instruction from the key-board 2. In this case, the displayed original images 52 and 53 are referred, the cursor 56 is moved by the mouse 2a, each desired image is cut out and synthesized on the editing image display 54, and processing such as enlargement, reduction, rotation, transfer, copy, and layout is performed. These are performed by well-known techniques. At step S29, the processing content (i.e., sequence of processing steps) which is executed at step S28 is stored in the procedure storage area 26a. Furthermore, the image which is the result of editing is always displayed on the editing image display 54. Then, at step S30, whether or not the edit operation has ended is confirmed. If the operation has ended, the process proceeds to step S31, while if the operation has not ended, the process returns to step S28, where the above processing is repeated.

At step S31, the coded data until the third stage of the image data used in the edit processing is read out from the database 5. The coded data is decoded by the decoder 10 at step S32 and the original image data is reproduced. The two original images 41 and 42 obtained from steps S31 and S32 are stored in the frame memories 6 and 7 respectively. The process proceeds to step S34 where the synthesized editing image is formed from the image data stored in the frame memories 6 and 7 based on the processing content of the edit operation stored in the procedure storage area 26a. At step S35, the image data is stored in the frame memory 8. At step S36, the image data stored in the frame memory 8 is hierarchically coded by the coder 9 and stored in the database 5 at step S37.

As described above, the data processing apparatus of the present embodiment performs hierarchical coding on the image data of a single screen and stored in the database 5 so as to reproduce the image of the single screen at the plurality of resolutions. An image can be reproduced at the plurality of resolutions by hierarchically decoding the coded data stored in the database. Thus, a high-speed edit processing is enabled by using the image data of the low resolution when reference screens (original image displays 52, 53, and an entire image display 55), an editing image display 54, and an edit operation are processed. Furthermore, a high-speed image search can be performed by using the image of the low resolution. The original image can be reproduced by sequentially decoding the coded data of the other stage if necessary, thus resulting in improvement in efficiency in the edit processing.

For the data used for the above image display, data of any resolution can be used, if processing speed, resolution of the display unit, or man-machine interface are considered. Furthermore, it can be arranged so as to select a resolution level of the data by the key-board 2.

Furthermore, the method such that the data of low resolution is displayed at first and the data of high resolution is gradually displayed by using process idle time of the CPU 1 is possible. The edit processing from step S31 to step S35 is executed after the edit operation, however, this processing can be executed by using the free time of the CPU 1.

Figure 9:
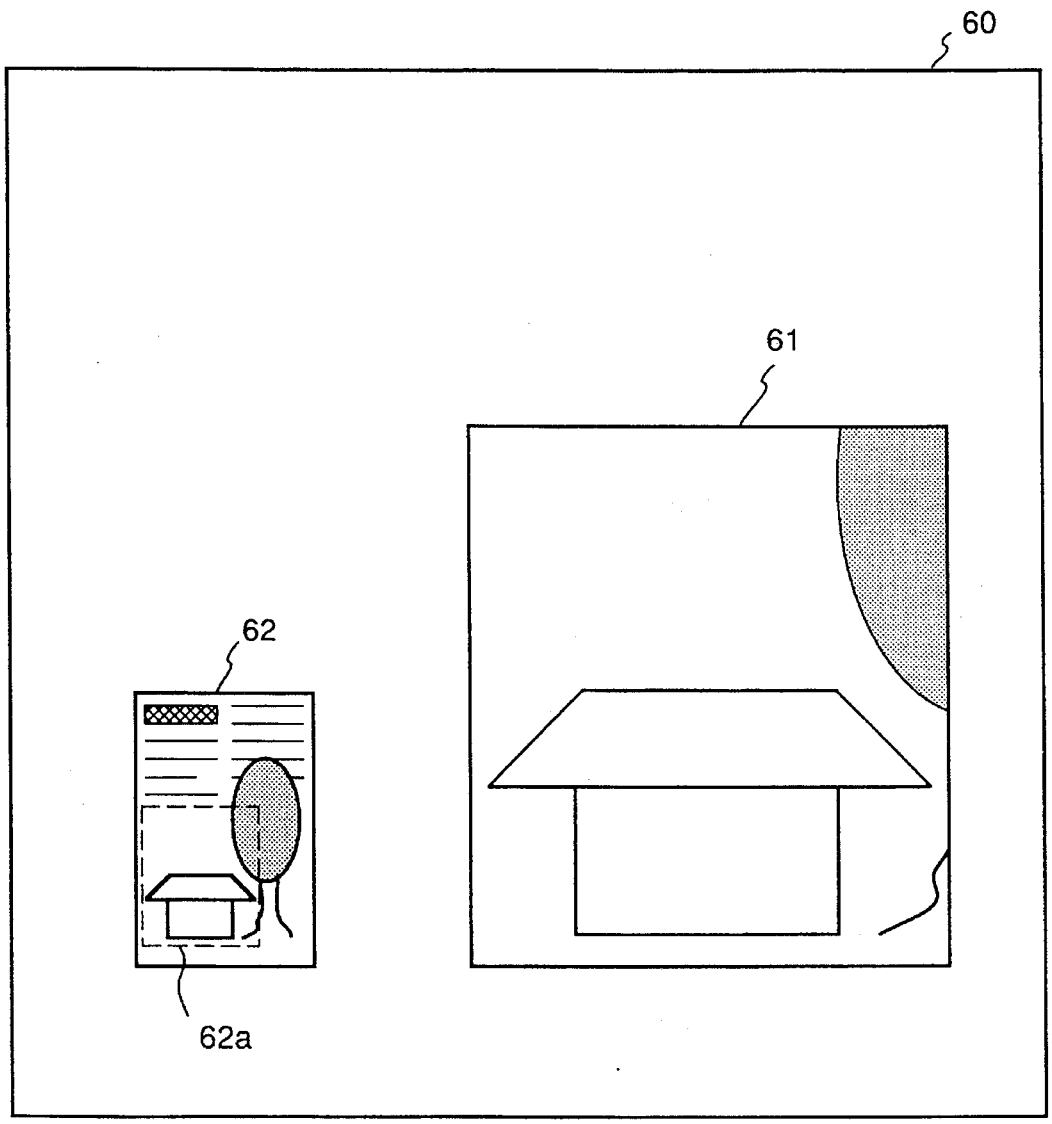
FIG. 9 shows another example of the screen at the edit operation in the data processing apparatus of the present embodiment.

In the above embodiment, as shown in FIG. 8, a plurality of display areas or windows are provided on the single screen, however, this does not impose the limitation upon the present invention, for a plurality of display screens can be provided and the images can be displayed on each display screen respectively. For example, FIG. 9 is another example of the editing screen of the image data and the original image is displayed on another display unit (not shown). Numeral 60 indicates a display screen shown on the display 3, numeral 61 is an image display to perform the edit operation, and numeral 62 is an entire image display showing the entire image for editing. In the entire image display 62, an area corresponding to the enlarged image displayed on the image display 61 is indicated by enclosing by a dotted line 62a. Thus, the image displayed on the image display 61 can be shown in the entire image display.

When the image for editing is enlarged, the image display 61 cannot show the entire editing image. In this case, the position of the image displayed on the image display 61 in the entire image display 62 can be clearly recognized by the dotted line 62a. There are various methods to indicate the enlarged portion corresponding to the portion of the entire image. For example, it can be arranged so that: (1) color within the area enclosed by the dotted line 62a is different from that of the outside; or (2) background color or background pattern is different between the enclosed area and the outside area. Accordingly, the position relation can be easily recognized.

In the edit operation, in order to simplify the operation, the portion to be enlarged can be designated on the entire image display 62 (e.g. as the dotted line 62a), and the selected portion is enlarged and displayed on the image display 61 for editing.

Furthermore, in the above embodiment, the key-board is used as an input apparatus, however, this is not necessary to, and does not place limitation upon the invention, for it can be replaced by a pointing device or tablet.

Still further, in the present embodiment, the processing is performed by using hierarchical coding of the image data and the coded data is stored in the database 5. However, this also is not a limitation upon the invention. For example, the original image data and image data of the low resolution can be stored in the database 5 without coding. In this case, the coder 9 and decoder 10 are not necessary. Still further, the image data having different resolutions can be coded by a single coder and stored in the database 5 without the hierarchical coding.

Still further, in the above embodiment, the content of the edit processing which is executed on the image data of the low resolution image is stored in the procedure storage area 26a, and the CPU 1 performs the edit processing on the image data of the high resolution in accordance with the content. However, this also does not limit the invention. For example, the content of the edit processing which is executed by analyzing the image data of the entire image display 55 which is reflected by the editing result is obtained and the edit processing can be performed on the image data of the high resolution by using this content.

As described above, according to the data editing method and apparatus of the present invention, high-speed image processing is enabled by using the image data of the low resolution in the image data processing and display in the edit operation.

The present invention can be applied to a system constituted by a plurality of devices, or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A data processing apparatus comprising:

storage means for storing at least image data having a low level of resolution and image data having a high level of resolution;

display means for displaying a first image using the image data having low resolution;

obtaining means for obtaining an object image by magnifying an image extracted from the first image;

control means for causing said display means to display the object image together with the first image;

indicating means for indicating a desired edit process using the object image displayed by said display means, wherein said control means causes said display means to display a result of performing the indicated edit process, said display means displaying that result on the object image and on a modification of the first image, the modification of the first image being the first image changed to reflect the result of the indicated edit process;

memory means for storing information indicating the edit process indicated by the indicating means; and processing means for editing the image data having high resolution in accordance with the information stored in said memory means.

2. The data processing apparatus according to claim 1, wherein the information stored in said memory means indicates a procedure of the edit process indicated by said indicating means.

3. The data processing apparatus according to claim 1, wherein said storage means stores original image data as the image data having high resolution and stores image data obtained by reducing the original image data as the image data having low resolution.

4. The data processing apparatus according to claim 1, wherein said storage means stores the image data as coded data of at least two levels of resolution, wherein the image data having low resolution is obtained by decoding the coded data corresponding to the lower resolution which is stored in said storage means, and wherein the image data having high resolution is obtained by decoding the coded data corresponding to the higher resolution which is stored in said storage means.

5. The data processing apparatus according to claim 1, wherein said storage means stores the image data by sequentially and hierarchically coding in order from the low resolution to the high resolution, wherein the image data having low resolution is obtained by decoding the coded data stored in said storage means, and wherein the image data having high resolution is obtained by decoding the coded data stored in said storage means.

6. The data processing apparatus according to claim 1, wherein said processing means executes the edit processing by using the image data having high resolution stored in said storage means, based on the information stored in said memory means, during idle time of execution of the low resolution edit process or after completion of execution of the low resolution edit process.

7. The data processing apparatus according to claim 1, wherein said display means displays a plurality of images by using the image data having low resolution.

8. The data processing apparatus according to claim 1, further comprising search means for searching for the image data which is to be displayed by said display means as the first image, by using the image data having low resolution.

9. The data processing apparatus according to claim 1, wherein the object image is formed by using the image data having high resolution.

10. The data processing apparatus according to claim 1, wherein the object image is formed by extracting a portion of image from the first image and magnifying the portion of image.

11. The data processing apparatus according to claim 10, wherein the object image is formed by using the image data having high resolution.

12. The data processing apparatus according to claim 10, further comprising portion indicating means for indicating a portion of the first image where the extracted portion of image exists.

13. The data processing apparatus according to claim 1, further comprising generation means for generating images corresponding to the first image and the object image by using the image data having the high level of resolution during process idle time at intervals of the execution of said indicating means, and changing means for causing said display means to display the images generated by said generation means instead of the first image and the object image which have previously been displayed.

14. The data processing method according to claim 1, wherein the first image displayed by said display means is an entire image.

15. A data processing method comprising:
a storage step for storing at least image data having a low level of resolution and image data having a high level of resolution;
a first display step for displaying a first image using the image data having low resolution;
an obtaining step for obtaining an object image by magnifying an image extracted from the first image;
a second display step for displaying the object image together with the first image;
an indicating step for indicating a desired edit process using the object image displayed in said second display step;
a third display step for displaying a result of performing the indicated edit process, said third display step being performed to show that result on the object image and on a modification of the first image, the modification of the first image being the first image changed to reflect the result of the indicated edit process;
a memory step for storing information indicating the edit process indicated in said indicating step; and
a processing step for editing the image data having the high level of resolution in accordance with the information stored in said memory step.

16. The data processing method according to claim 15, wherein the information stored in said memory step indicates a procedure of the edit process indicted in said indicating step.

17. The data processing method according to claim 15, wherein said storage step stores original image data as the image data having high resolution and stores image data obtained by reducing the original image data as the image having low resolution.

18. The data processing method according to claim 15, wherein said storage step stores the image data as coded data of at least two levels of resolution,
wherein the image data having low resolution is obtained by decoding the coded data corresponding to the lower resolution which is stored in said storage means, and
wherein the image data having high resolution is obtained by decoding the coded data corresponding to the higher resolution which is stored in said storage step.

19. The data processing method according to claim 15, wherein said storage step stores the image data by sequentially and hierarchically coding in order from the low resolution to the high resolution,
wherein the image data having low resolution is obtained by decoding the coded data stored in said storage step, and
wherein the image data having high resolution is obtained by decoding the coded data stored in said storage step.

20. The data processing method according to claim 15, wherein said processing step executes the edit processing by using the image data having high resolution stored in said storage step, based on the information stored in said memory step, during idle time of execution of the low resolution edit process or after completion of execution of the low resolution edit process.

21. The data processing method according to claim 15, wherein said first display step displays a plurality of images by using the image data having low resolution.

22. The data processing method according to claim 15, further comprising a search step for searching for the image data which is to be used for the first display step by using the image data having low resolution.

23. The data processing method according to claim 15, wherein the object image is formed by using the image data having high resolution.

24. The data processing method according to claim 15, wherein the object image is formed by extracting a portion of image from the first image and magnifying the portion of image.

25. The data processing method according to claim 24, wherein the object image is formed by using the image data having high resolution.

26. The data processing method according to claim 15, further comprising a portion-indicating step for indicating a portion of the first image where the image extracted in said obtaining step exists.

27. The data processing apparatus according to claim 15, further comprising a generation step for generating images corresponding to the first image and the object image by using the image data having the high level of resolution during process idle time at intervals of the execution of said indicating step, and a fourth display step for displaying the images generated in said generation step instead of the first image and the object image which have previously been displayed.

28. The data processing method according to claim 15, wherein the first image displayed in said first display step is an entire image.

* * * * *

UNITED STATES PATENT AND TRADEMARK OFFICE
CERTIFICATE OF CORRECTION

PATENT NO. : 5,548,708
DATED : August 20, 1996
INVENTOR(S) : YUKIHIKO SAKASHITA ET AL.   Page 1 of 2

It is certified that error appears in the above-identified patent and that said Letters Patent is hereby corrected as shown below:

AT [57] ABSTRACT

Line 10, "Editing" should read --Editing,--.
    Line 15, "ends," should read --ends, the--.

COLUMN 1

Line 23, "processing" should read --processing,--.

COLUMN 3

Line 31, "Numeral" should read --Numerals--.
    Line 32, "numeral" should read --numerals--.
    Line 57, "obtained" should read --obtain--.

COLUMN 4

Line 14, "Numeral" should read --Numerals--.
    Line 15, "numeral" should read --numerals--.

COLUMN 6

Line 16, "referred" should read --referred to--.

COLUMN 7

Line 39, "place" should read --place a--.

UNITED STATES PATENT AND TRADEMARK OFFICE
CERTIFICATE OF CORRECTION

PATENT NO. : 5,548,708
DATED : August 20, 1996
INVENTOR(S) : YUKIHIKO SAKASHITA ET AL.        Page 2 of 2

It is certified that error appears in the above-identified patent and that said Letters Patent is hereby corrected as shown below:

COLUMN 9

Line 66, "indicted" should read --indicated--.

Signed and Sealed this

Seventh Day of January, 1997

Attest:

BRUCE LEHMAN

Attesting Officer        Commissioner of Patents and Trademarks